May 16, 1939. J. REICHERT 2,158,427
PROCESS FOR EXTRACTING OIL OR FAT CONTAINING SUBSTANCES AND THE LIKE
Filed July 7, 1936
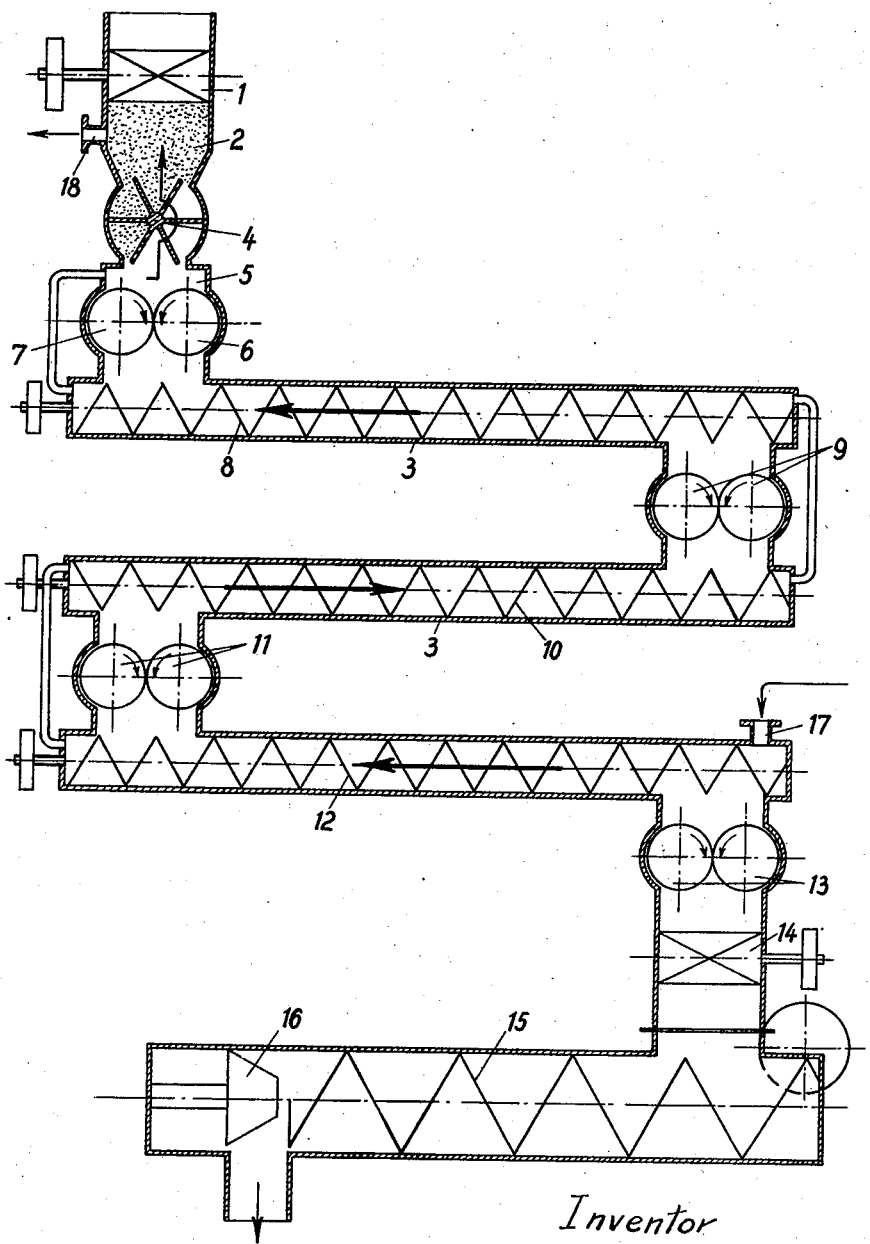
Inventor
J. Reichert
By C. F. Wendeworth
Atty Patented May 16, 1939

2,158,427

UNITED STATES PATENT OFFICE 2,158,427

PROCESS FOR EXTRACTING OIL OR FAT CONTAINING SUBSTANCES AND THE LIKE

Joseph Reichert, Wiesbaden, Germany

Application July 7, 1936, Serial No. 89,428
In Germany May 10, 1935

2 Claims. (Cl. 87—6)

The invention concerns a process for extracting substances of all kinds, particularly oil- or fat-containing substances.

The extraction of oil- or fat-containing substances, such as oil seeds, with solvents, such as benzine or carbon tetrachloride and the like, has hitherto been effected by very extensively disintegrating the said substances after warming by a comminuting operation before the commencement of the extraction process and then subjecting the disintegrated material to an extraction process with solvents. This extraction process as a rule lasted one hour and longer. In the case of substances containing large quantities of oil, such as ground or earth nuts, copra and the like, the extraction process was preceded by a pressing operation, in order to remove the main quantity of the oil by simple expressing. The previously pressed seed was then again warmed, further comminuted and thereafter extracted.

A process is also known, according to which seeds containing large quantities of oil are extracted, without a preliminary pressing operation, by repeated expressing during the extraction process. In this case, however, the preceding comminuting operation requires very great care and extensive comminuting apparatus, since the substances containing large quantities of oil cannot be comminuted to the same far-reaching extent as substances containing small quantities of oil and consequently it is difficult to effect complete removal of the oil.

A process is also known in which comminution and extraction are effected simultaneously, but it relates merely to the recovery of oil from the meats of oil seeds, for example, palm fruits, olive fruits, whereby the meats are comminuted in the presence of hot water. The present invention does not relate to this method of extraction. It merely covers the oil seeds (kernels) removed from the meats, which are comminuted mechanically, by rollers, etc.

The aforesaid known extraction processes are however attended by a number of disadvantages, the chief of which are as follows:

In the first place the seeds must be warmed before comminution in order to facilitate crushing between rollers, whereby the costs of the oil recovery process are raised. If seeds containing large quantities of oil are comminuted considerable quantities of oil are lost. In this case also, owing to the high content of oil, the comminution of the seeds cannot be carried so far that no uncomminuted particles remain and also undergo extraction, a fact which renders satisfactory removal of oil difficult.

In the second place, owing to the warming of the seeds and the heat resulting from the comminution, the quality of the oils and of the dry substance contained in the seeds is impaired by oxidation processes on the passage of the seeds from the comminuting plant to the extraction plant. Moreover the extraction according to the known processes requires a relatively long time, as a rule more than one hour, it being also very frequently necessary to employ hot benzine in order to improve the extraction and shorten the time of extraction, whereby, however, the costs of recovering the oil are increased.

In the third place, owing to the long time of extraction, particularly when employing hot benzine or the like, substances are dissolved by the solvent out of the seeds, which are undesirable and which both impair the quality of the extracted oils and also reduce the nutritive value of the extraction residues. Notwithstanding the use of hot benzine and the long time of extraction, the yield of oils obtained by the known processes is in many cases unsatisfactory in proportion to the expended costs.

A process for extracting oils from seeds is also known, according to which the seeds are very extensively comminuted in a solvent and the solvent is used in such quantities that a semi-liquid, cream-like mass is obtained from the comminuted seeds and the solvent, which mass is then subjected to a pressing operation, by means of which the solvent together with the oil dissolved therein is separated from the solid comminuted seed residues. This process, however, has the disadvantage that the resulting pressed residue still contains very large quantities of oil and must consequently be extracted and thereafter washed with fresh solvent. It is moreover impossible to effect satisfactory and complete extraction of the oils from the oil-seeds by subjecting the latter to a single comminuting operation, expressing the aforesaid cream-like mass of solvent and comminuted material and thereafter extracting the pressed residue. If moreover the seeds are reduced to a fine powder by passing through a grinding mill as in the known process, the resulting miscelles (mixture of solvent and oil) will contain a large quantity of clouding substances, which render filtration of the miscelles extremely difficult.

According to this invention it has been found that the above disadvantages can be completely avoided by carrying out the extraction in such a way that the material to be extracted, for example oil-seeds, is comminuted mechanically in the solvent, for example with the aid of crushing mills or grooved rollers disposed in the latter, the solvent during this procedure being passed through the apparatus in counter-current to the material undergoing extraction. The comminution of the material in the solvent is with advantage carried out in stages in such a way that coarse comminution first takes place and thereafter more and more extensive fine comminution with accompanying and following extraction with the solvent.

The process of this invention possesses the following substantial advantages over the first mentioned known processes:

Since both the comminution and the disintegration of the material take place in the solvent itself, the extraction is effected without loss of oil, because the oil discharging from the material during comminution is immediately taken up by the solvent and removed.

Furthermore the extraction of the material in the so-called "statu nascendi" of the comminution is insofar an advantage, as in this way the benzine or other solvent can more easily penetrate into the opened up cells, than if the material were first to be comminuted as hitherto in a separate operation and then brought into contact and extracted with the solvent in a further operation.

In the comminution of oil-seeds, for example soya beans, by rolling the seeds out into lamellae or grinding them into groats it was observed that these lamellae or groats in the absence of a solvent very soon alter in structure, contract and thicken, with the result that during the following extraction process they oppose a resistance to the penetration of the solvent, whereby the extraction is rendered difficult. In the case of seeds containing large quantities of oil or albumin furthermore the comminuted material shortly after comminution becomes pasty and small globules and lumps are formed, which thereafter likewise render difficult the entry of the benzine or the like into the opened up cells during the extraction process. If however in accordance with this invention the extraction is carried out simultaneously with the comminution these disadvantages do not occur.

By comminuting the material, for example oil-seeds, in the solvent the hitherto observed detrimental action of the oxygen of the air on the comminuted material is also avoided, since owing to the presence of the solvent the entry of oxygen into the comminuted seeds or the like is prevented. This however results in a substantially better quality of the resulting products, for example oil and the residues of the seed extraction. This is for example shown by the fact that the oils, recovered according to the process of this invention, possess the same iodine number as the oil contained in the seeds, whilst the iodine numbers of the oils recovered by the hitherto known processes undergo changes owing to the action of the oxygen of the air as well as the long duration of the extraction process.

Owing to the increase in the oil yield obtainable according to the invention, the procedure of pre-heating the material or the extraction agent otherwise usually employed for this purpose can be omitted, so that not only is the entire expenditure of heat for this purpose saved, but also detrimental effects of the heating are avoided. Furthermore, if the comminution of the material is effected in accordance with this invention in the solvent, the latter acts to a certain extent as a cooling agent, which takes up the detrimental heat otherwise occurring during comminution.

Finally when employing the process of this invention it was also observed that, notwithstanding the increase in oil yields owing to the short time of extraction and the low temperature of the solvent, only the desired extraction substances are extracted from the material, whilst the undesirable substances, which would detrimentally influence the quality of the extracted oils, remain in the extraction residues and accordingly increase their nutritive value.

Furthermore the process of this invention enables the entire extraction plant and the management to be simplified and cheapened. The space requirement also becomes less, since the comminuting and conveying apparatus are disposed in the solvent bath itself. The amount of benzine circulated also becomes less, since, owing to the very extensive comminution and opening up of the material effected in the solvent and the extremely intensive osmotic action produced thereby, highly concentrated miscelles (mixture of solvent and extracted oil) are obtained, which results in an economy in steam and cooling water in the subsequent distillation of the miscelles.

The process of this invention has the substantial advantage over the known process, according to which, it is true, comminution of the oil-seeds takes place in the solvent, but the resulting mixture of solvent, dissolved oil and comminuted material is subjected to a pressing operation and the pressed residues are thereafter washed, that, owing to the fact that the material to be extracted is conveyed in countercurrent to the solvent, the latter first acts on the very extensively comminuted and already very extensively extracted material, with the result that complete removal of the oil from the material is effected and residues are obtained, which no longer require subsequent washing. On the other hand the solvent on its passage through the extraction plant in this way constantly comes into contact with material still richer in oil, so that it continuously becomes enriched with oil and accordingly miscelles very rich in oil are obtained. In addition, according to this invention owing to the employment of the countercurrent method the comminution and extraction of the material are combined into one operation and the process of this invention can be carried out continuously, whilst in the known process the procedures of expressing the solvent and the dissolved oils from the solid residues and the washing of the pressed cake must be carried out in separate stages.

Moreover, since according to the process of this invention it is only necessary to effect coarse comminution during the first comminuting operation and in the further comminuting operations solvent has already penetrated into the material and oil has been dissolved out therefrom and accordingly the cellular structure of the material has been loosened, the comminution of the material may also be carried out with less expenditure of power than in the known processes. For this reason also heavy rollers are no longer necessary for the comminuting operation, but thin-walled comminuting rollers, which operate with spring pressure, may be employed. The material to be extracted is with advantage softened before the aforesaid coarse comminuting operation in the miscelles produced, before the latter leave the extraction plant, so that the coarse comminuting operation is in this way facilitated.

If desired the material may be subjected between the individual comminuting and extracting stages to additional pressing operations, which likewise take place in the solvent, whereby the time of extraction is still further shortened.

The degree of comminution of the material depends on the nature of the starting materials under treatment, the comminution being effected in such a way as to produce lamellae, groats or flour. Finely grained substances, for example rape seed, linseed and the like, are introduced directly in a non-comminuted condition into the extraction apparatus, in which they are comminuted and extracted. Coarsely grained substances may also be previously subjected to coarse comminution in a cold condition and be then introduced into the extraction apparatus, where subsequent comminution and extraction take place simultaneously.

The process of this invention is not only suitable for oil-seeds, but for all kinds of extractable substances.

*Example*

Ground or earth nuts are coarsely precomminuted in a cold condition in known manner, for example with the aid of grooved rollers, to a size of grain of about 5 mm., after which they are introduced into the feed hopper 2, provided with a closing member 1, of the extraction plant 3, illustrated in the accompanying drawing. From this feed hopper, which as well as the entire extraction plant is filled with the solvent, for example benzine, the pre-comminuted ground or earth nuts are continuously introduced in measured quantities through a feed device, for example in the form of a pocketed or bucket wheel 4, into a comminuting device 5, for example in the form of two parallel disposed grooved rollers 6 and 7, integral with the extraction plant and mounted below the aforesaid hopper. The pre-comminuted ground or earth nuts, into which the solvent in the funnel has penetrated, are squeezed, expressed and further comminuted by the aforesaid comminuting device 5, whereby the expressed oil is immediately taken up by the solvent. The comminuted ground or earth nuts are then conveyed by a horizontal screw conveyor 8, disposed below the aforesaid comminuting device and rotating in the solvent, to a second comminuting device 9 integral with the extraction plant and for example in the form of two grooved rollers, with the aid of which the ground or earth nuts, which have been again saturated during this further conveyance with the solvent, are again squeezed out and further comminuted and de-oiled. The comminuted ground or earth nuts pass from this comminuting device into the screw conveyor 10 disposed thereunder, which conveys them to a third comminuting device 11, for example in the form of two crushing rollers, with the aid of which the ground or earth nuts, which have been again saturated with the solvent during their passage along the screw conveyor 10 are again squeezed out and further comminuted and de-oiled. The treated comminuted ground or earth nuts are conveyed from this comminuting device by the screw conveyor 12 to a pair of rollers 13, with the aid of which they are again squeezed out, after which they pass through a sluice 14 into a screw conveyor 15, with the aid of which the oil-free extraction residues now obtained are conveyed to a press 16 and finally to a drying device. Between the aforesaid comminuting devices 5, 9, 11 and 13, squeezing rollers, presses or the like, may also be provided, with the aid of which the extraction process can be accelerated. The solvent, for example benzine, is introduced into the extraction plant at 17 and is passed through the extraction plant in countercurrent to the material under treatment, after which the solvent charged with the oil (miscelle) is withdrawn from the plant at 18 and is then conveyed to the distillation plant.

What I claim is:

1. A process for the continuous extraction of oil seeds with solvents, which comprises comminuting the seeds in their passage through the extraction plant in the solvent in a series of separate steps in which they are ground to a successively increasing fineness and passing the solvent in countercurrent to the seeds through said extraction plant.

2. A process for the continuous extraction of oil seeds with solvents, which comprises comminuting the seeds in their passage through the extraction plant in the solvent in a series of separate steps in which they are ground to a successively increasing fineness and passing the solvent in countercurrent to the seeds through said extraction plant and pressing said seeds between the individual comminuting steps.

JOSEPH REICHERT.